(12) United States Patent
Huang et al.

(10) Patent No.: US 9,122,302 B2
(45) Date of Patent: Sep. 1, 2015

(54) AUTOMATIC GARAGE DOOR AUTOMATIC MONITORING AND CONTROLLING SYSTEM BASED ON THE INTERNET OF THINGS CONCEPT AND NEAR FIELD COMMUNICATION (NFC) TECHNOLOGY

(71) Applicants: Yue Huang, Atlanta, GA (US); Wei Huang, ChengDu (CN); Demin Zhou, ChengDu (CN); Jiadong Zhang, ChengDu (CN)

(72) Inventors: Yue Huang, Atlanta, GA (US); Wei Huang, ChengDu (CN); Demin Zhou, ChengDu (CN); Jiadong Zhang, ChengDu (CN)

( * ) Notice: Subject to any disclaimer, the term of this patent is extended or adjusted under 35 U.S.C. 154(b) by 25 days.

(21) Appl. No.: 13/718,412

(22) Filed: Dec. 18, 2012

(65) Prior Publication Data
US 2014/0171032 A1    Jun. 19, 2014

(51) Int. Cl.
*H04M 3/00*    (2006.01)
*G06F 9/00*    (2006.01)

(52) U.S. Cl.
CPC ........................................ *G06F 9/00* (2013.01)

(58) Field of Classification Search
USPC ..................... 455/420, 414.1, 41.2, 419, 418; 340/686.1, 5.61
See application file for complete search history.

(56) References Cited

U.S. PATENT DOCUMENTS

| 2010/0201482 A1* | 8/2010 | Robertson et al. | ........... 340/5.61 |
| 2010/0289661 A1* | 11/2010 | Styers et al. | ............... 340/686.1 |
| 2013/0103946 A1* | 4/2013 | Binenstock | ................... 713/168 |

* cited by examiner

*Primary Examiner* — Chuong A Ngo
(74) *Attorney, Agent, or Firm* — Oakwood Law Group, LLP

(57) ABSTRACT

A method and system are provided for remotely monitoring the open and close status of a garage door via the internet based on the internet of things concept and NFC (Near Field Communication) technology. The system includes a Door Monitoring & Controlling Device (DMCD) and a web based Advanced Door Management System. The DMCD contains a NFC module, and one or more NFC close/open status tags which work together to monitor the status of the garage door. The NFC tag in this system not only provides status signal but also provides network configure data that eliminates the need to make standalone device configurable for network connectability. The use of NFC technology here will reduce manufacturing cost significantly, and make the configuration easy. The method and system also enable users to remotely open and close the garage door via the internet.

16 Claims, 5 Drawing Sheets

AUTOMATIC GARAGE DOOR AUTOMATIC MONITORING AND CONTROLLING SYSTEM BASED ON THE INTERNET OF THINGS CONCEPT AND NEAR FIELD COMMUNICATION (NFC) TECHNOLOGY

BACKGROUND OF THE INVENTION

1. Field of the Invention

The invention relates to an automatic garage door automatic monitoring and controlling system and more specifically, it relates to an automatic garage door monitoring and controlling system based on the internet of things concept and NFC technology.

2. Description of Related Art

Sometimes, people forget to close their garage door after they leave their house. They may start to remember that they forgot to close their garage door. Unfortunately, they cannot do anything because they have to be physically next to the garage door to close it. Therefore, there is a need for a system which allows users to monitor the garage door status and control the opening and closing of the garage door from anywhere.

Most garage door systems today require mechanical contacts or other more expensive hardwired components for monitoring the door status. Although currently, there are internet based remote garage door monitoring and opening/closing systems, such as LiftMaster openers enabled by MyQ technology and Craftsman's Assurelink, these systems require configuring a standalone device to connect to a network and it is costly to build a configurable interface for such a small device.

There are fundamental differences between this invention and LiftMaster and Craftsman's Assurelink, a. both Liftmaster and Craftman system use two pieces equipment connecting to the Internet. a wired Internet access box (Liftmaster Internet gateway, and Crafman Internet interface device), and a proprietary wireless communication between the Internet gateway box and the garage door operator. This invention is the first to use existing wifi technology to access the Internet. such design will save the cost of building an Internet gateway box. It is typically a router's cost.

The reason they have to use two pieces equipment is mainly because they have not found a way, such as NFC, to actually configure a standalone system that can access wifi directly.

b. both liftmaster and craftman system don't have status monitoring system. they use their build-in garage operating system to get such information. therefor their system can not be used as a stand alone system. They can only be used for the system that are "enabled" for their technology. While this invented technology described herein can however be used on any existing system, which has a much bigger market.

c. the installation for these other systems could be rather costly. As mentioned on the Internet, it costs roughly $200 if someone were to go through Sears for a Craftman's system installation.

Said invention discussed herein provides not only a none mechanical contact monitoring system, it also provides a standalone monitoring system that can monitor any open closed status of two objects. It does not rely upon any other system to get such information. Therefore it is very different from the Craftman and Liftmaster systems.

Accordingly, there is a need for a system and method that provides a platform that removes the need for mechanical contact/expensive hardwired components, reduce the cost of manufacturing the monitoring module, simplify user network configuration resulting in a system that is cheaper to make, easier to install, and easier to use.

SUMMARY OF THE INVENTION

An object of the present invention is to provide a garage door monitoring module that is cheap to make and easy to install.

Another object of the present invention is to provide the world's first system to use NFC technology which does not require mechanical contacts/hardwire between the tag and tag reader or other more expensive components for monitoring the door status.

Another object of the present invention is to provide a system that uses NFC technology in place of the very costly to make standalone device configurable for the network connect ability.

Another object of the present invention is to provide a system with simplified user network configuration process, making the system easy to use for all customers by using the NFG tags in this system.

Another object of the present invention is to provide a system that provides the functions of monitoring, alarming, and controlling the open and close status of a garage door via the Internet.

These can be achieved with a system based on internet of things concept and NFC technology.

Near Field Communication (NFC) technology is a short range wireless connectivity technology designed for intuitive, simple and safe communication between electronic devices. NFC devices can configure Wi-Fi and Bluetooth® technology sessions between devices without consumer interaction. NFC tags can provide network configuration data. The tag may be moved close to the NFC enabled device which will be configured to connect to the router in the user's house.

A method and system are provided for remote monitoring and controlling the automatic garage door based on the internet of things concept and NFC (Near Field Communication) technology. The system includes a Door Monitoring & Controlling Device (DMCD) and a web based Advanced Door Management System (ADMS). The DMCD contains a CPU; an alarm auxiliary module, a NFC communication module, one or more NFC close/open status tags, a network interface module, and a wireless remote control module. The ADMS contains an alarm module, a user management module, a device management module and an UI module for user accessing via the Internet with a PC or a mobile device.

This system allows users to monitor and control their garage door opener on the Internet where Majority of the functions of this system will be hosted on the Internet. A hosted door monitoring system can generate revenue by collecting monthly or annual fees from the customer.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

Figure 1:
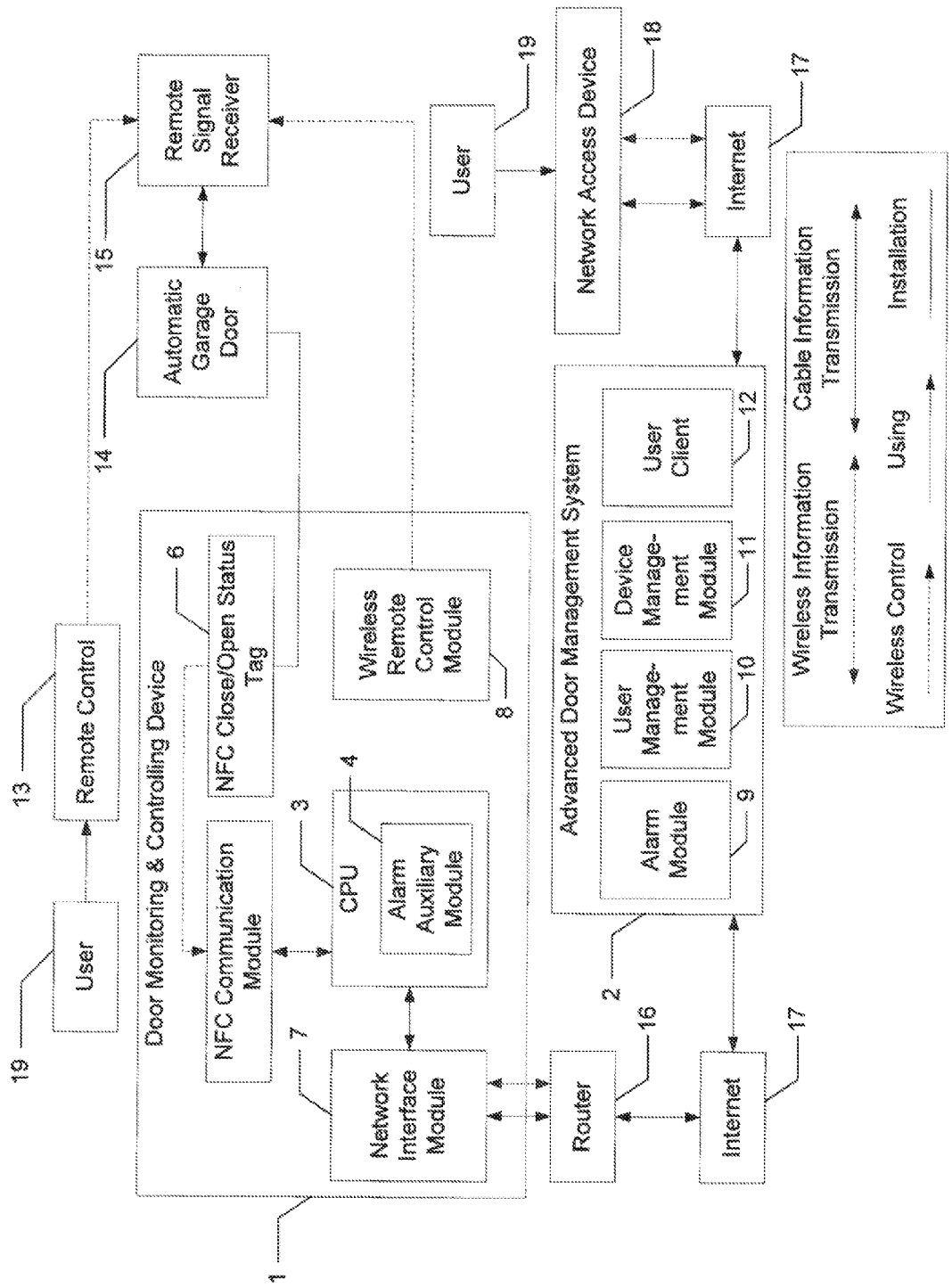
FIG. 1 illustrates a block diagram of an automatic garage door automatic monitoring and controlling system based on the Internet of things and NFC technology according to one embodiment of the present invention.
Figure 4:
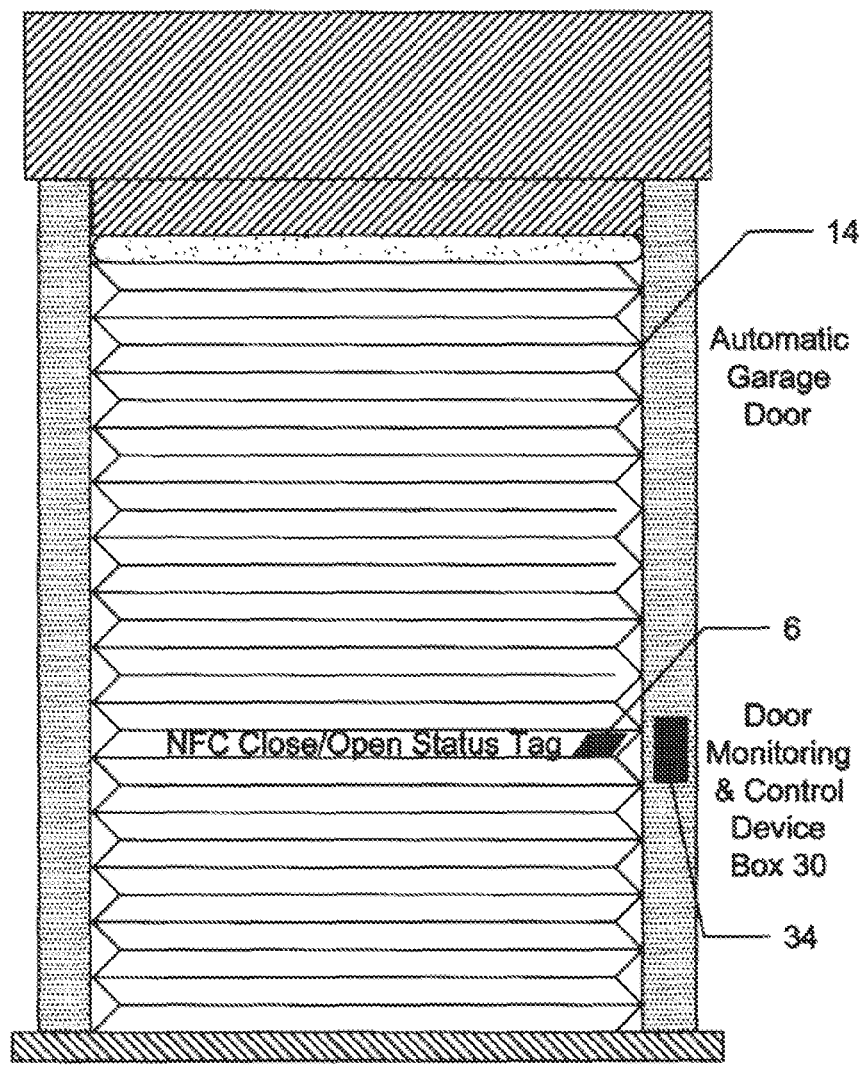
FIG. 4 is a perspective view showing the NFC close/open status tag and the Door Monitoring &Controlling Device box according to one embodiment of the present invention when the door is closed.
Figure 5:
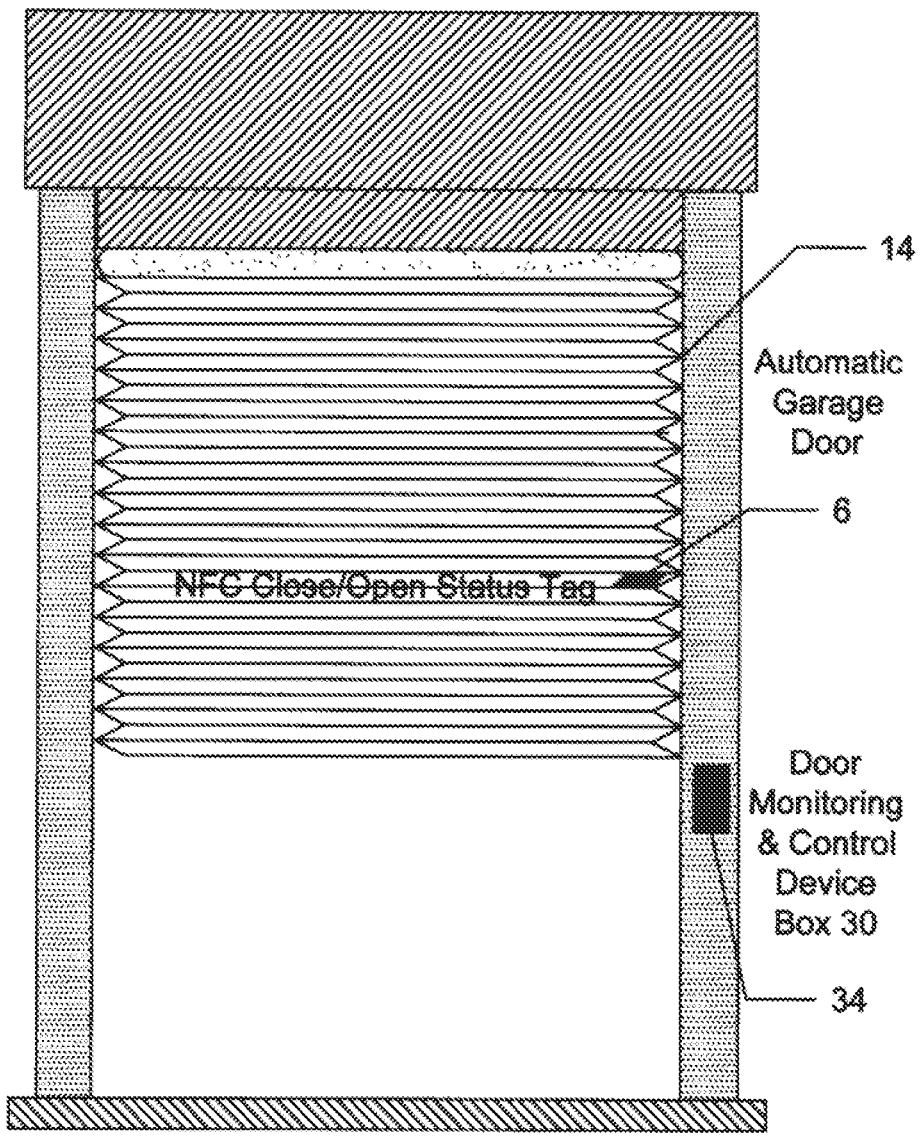
FIG. 5 is a perspective view illustrating the location of the NFC close/open status tag and the Door Monitoring &Controlling Device box according to an embodiment of the present invention when the door is open.

Referring to FIG. 1, there is disclosed a schematic diagram of the automatic garage door monitoring and controlling system based on the Internet of things concept and near field communication according to one embodiment of the present invention. This system provides the functions of monitoring, alarming, and controlling the open and close status of a garage door via the Internet. The system, generally designated by the reference numeral 100, comprises a door monitoring & controlling device ("DMCD") 1, and a web-based advanced door management system ("AMDS") 2. The DMCD 1 includes a central process unit ("CPU") 3, an alarm auxiliary module 4, a NFC communication module 5, one or more NFC close/open status tag 6, a network interface module 7, and a wireless remote control module 8, all of which are encased in the same box 30 and installed on the garage door frame or a wall of the garage that is very close to the garage door. The DMCD 1 further includes one or more NFC close/open status tag 6 which are installed on the garage door and move along with the garage door (FIGS. 4 and 5).

The system 100 can work in conjunction with most garage door openers currently available in the marketplace. The system 100 may also comprise garage door openers 50 which use existing RF technologies that are known in the art. The garage door opener 50 including a remote control 13 which sends out remote signal to a remote signal receiver 15 controls the closing/opening of the automatic garage door 14.

The system is the first in the world to use NFC technology for monitoring the door status. NFC technology does not need mechanical contact between the tag and tag reader and thus making the monitoring method reliable and easy to install.

Because the NFC close/open status tag 6 is a passive device it only communicates with an active device when it is in vicinity. The NFC communication module 5 is an active NFC device which can generate the RF field to power the NFC close/open status tag 6 which can then communicate the close/open status with the NFC communication module 5.

According to the present invention, there are at least two implementations for monitoring the close/open status of the automatic garage door 14. In one embodiment as shown in FIG. 4, only one NFC close/open status tag 6 is attached to the garage door. When the remote signal receiver 15 receives the "close" signal and closes the automatic garage door 14, the tag 6 comes in close range (about 4 cm) with the NFC module 5 inside the DMCD as shown in FIG. 4. The NFC module 5 tells the DMCD 1 that the garage door is closed. DMCD 1 will then start to check at fixed interval if a tag is in the range. Once it moves away, the DMCD 1 will know the door is not closed (as shown in FIG. 5).

In another embodiment, the system 100 or DMCD 1 may include two tags 6; the "open tag" is installed at a lower position, and the "close tag" is installed at an upper position. When the "close tag" moves close to the NFC module 5, the monitor knows the door is closed. When the door moves up, the "open tag" will pass the NFC module 5 and trigger a door open signal.

The NFC tag(s) 6 in this system not only provide status signal but also provide network configure data. Since it is very costly to make standalone device configurable for network connectability, the use of NFC technology here will reduce manufacturing cost significantly, and make network configuration easy.

The NFC module 5 transmits the information it received from the NFC close/open status tag 6 to the CPU 3 which then processes the information and transmits it to the network interface module 7 that is used for connecting DMCD 1 to the router 16 through a wireless or wired method. The router 16 is connected to the internet 17.

CPU 3 is further used for connecting and controlling peripheral modules including wireless remote control module 8 and network interface module 7 and provides software operating environment. The alarm auxiliary module 4 inside the CUP 3 is used for assisting the alarm module 9 in ADMS 2.

The web based Advanced Door Management System ("ADMS") 2 contains an alarm module 9, a user management module 10, a device management module 11 and a user interface ("UI") module 12 for user access through the Internet 17 with a Network Access Device 18 such as a PC or a mobile device. ADMS 2 is used for providing the function of managing device information, collecting current door position status data, sending change door position command, manage user information, accept user request from the Internet.

In contrast to the liftmaster and craftman's system, this system does not use door status information from the garage door operating system. Therefore, it is a truly standalone system. Another standalone system filed in U.S. Pat. No. 7,602,283, does not use a Internet hosting approach as is utilized herein. This point again makes other system designs not practical in considering terms of cost verses our system.

The alarm module 9 is used for sending the alarm information via email, or instant message, or phone call to users 19. User management module 10 is used for managing users' information, authenticating user log in to the system, allowing user to setup alarming rules. Device management module 11 is used for managing DMCD 1 information, recording door position status send by DMCD 1, sending door status change command to DMCD 1 according to user command. The user client interface 12 is used for providing graphic user interface for authenticating user, displaying position status of monitored doors, accepting user setting, and taking command from users 19.

A system and method 100 according to the present invention provides a website or app in mobile device containing the ADMS 2 for users 19 to log in and check garage door status and remotely control the garage. Once the user 19 registers on the website or app containing the ADMS 2, the system and method 100 creates a user account and provides access credentials for consumer to log in. The ADMS 2 will provide the user sophisticated functionalities.

If a user uses a network access device 18 to access the device management module 11 of the ADMS 2 to send door status change command to DMCD 1 according to the user command, the transmission of information will go from the ADMS 2 on the internet 17 to the router 16 to the network interface module 7 to the CPU 3 where the CPU 3 communicates with the wireless remote control module 13. The wireless remote control module 13 then sends close or open signal to the remote signal receiver 15 which is connected to the automatic garage door 14 to open or close the garage door 14.

If the user gives command remotely to close the garage door, the tag 5 will come in close range (about 4 cm) with the NFC module 6 inside the DMCD 1 as shown in FIG. 4. DMCD 1 will power and receive information from the tag and the DMCD 1 will indicate that the door is closed and send that information to the CPU 3 where it processes the information and transmits it to the network interface module 7 that is used for connecting DMCD 1 via the router 16 via a wireless or wired method. The router 16 is connected to the internet 17 and updates and records the current door position status sent by the DMCD 1 into the device management module 11 of the ADMS 2.

Once the NFC tab 6 moves away, the DMCD 1 will no longer receive information from the tag and the DMCD 1 will indicate that the door is not closed (as shown in FIG. 5) and sends alarm by the alarm auxiliary module 4 to the alarm module 9 in the ADMS 2 which in turn sends out the alarms.

Figure 2:
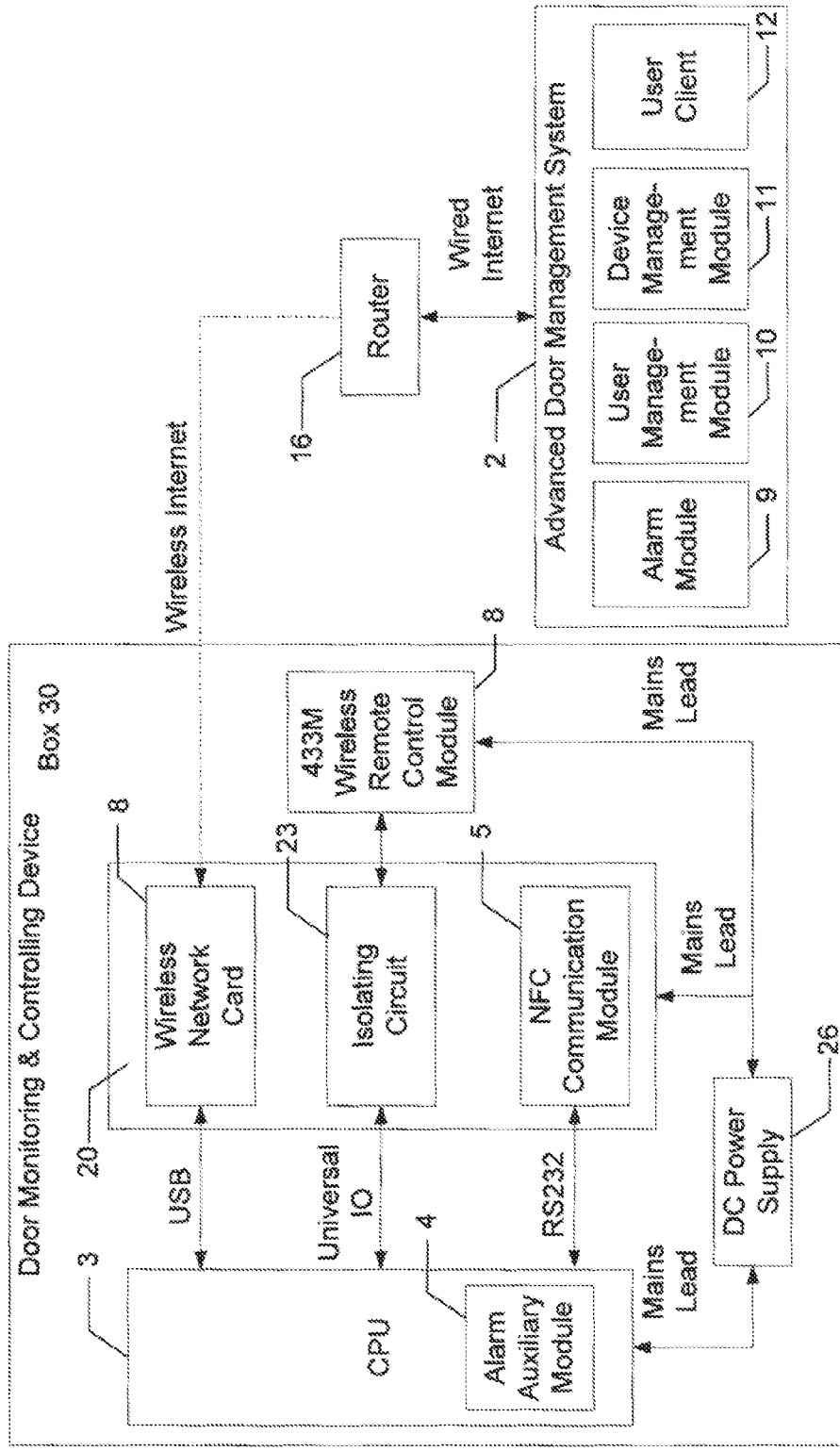
FIG. 2 is a block diagram showing the circuits and components arrangement within the DMCD box according to one preferred embodiment of the present invention.

FIG. 2 is a block diagram showing the circuits and components arrangement within the DMCD box 30 according to one preferred embodiment of the present invention. The DMCD box 30 contains a CPU 3 and an alarm auxiliary module 4; and a circuit board 20 which includes: a NFC module 5 connected to the CPU 3 through RS232, an isolating circuit 23 connected to the CPU 3 through a universal 10 and a wireless network card 8 connected to the CPU 3 through universal serial bus ("USB"). The DMCD box 30 also contains a 433M wireless remote control module 9 which is connected to the isolating circuit 23. The DMCD box 30 also contains a DC power supply 26 that powers the CPU 3, alarm auxiliary module 4, the circuit board 20 containing the wireless network card 22, isolating circuit 23, NFC communication module 24, and the 433 wireless remote control module 8 through mains lead. The wireless network card 8 transmits information to the router 16 which is wired to the internet ADMS 2 containing the alarm module 9, user management module 10, device management module 11, and user client 12.

Figure 3:
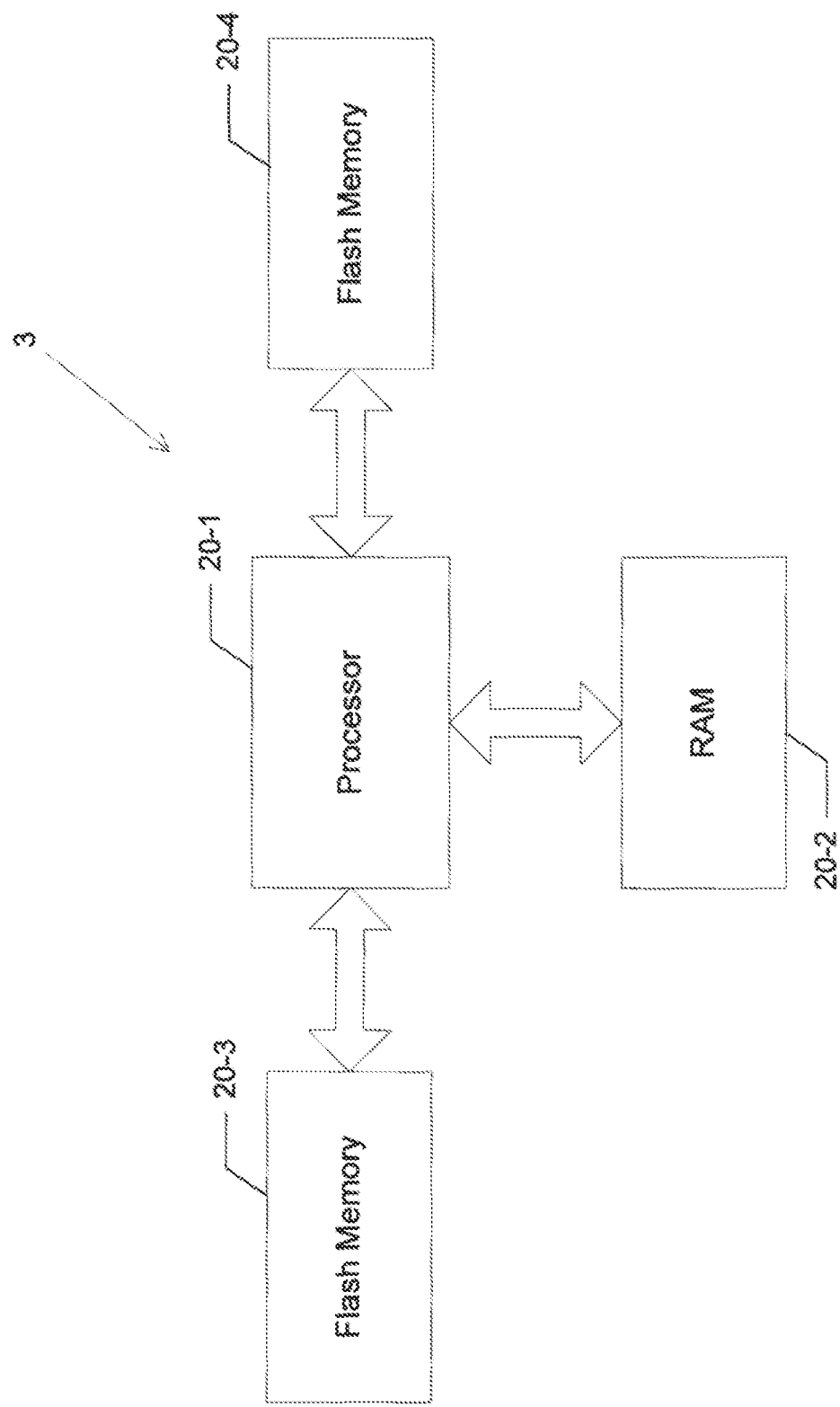
FIG. 3 is a block diagram illustrating the circuits and components arrangement within the CPU in accordance to one preferred embodiment of the present invention.

FIG. 3 is a block diagram illustrating the circuits and components arrangement within the CPU 3 in the preferred embodiment. The CPU 3 contains processor 20-1 that is connected to the ram 20-2, flash memory 20-3, and USB communication circuit 20-4.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. An automatic garage door automatic monitoring and controlling system based on the Internet of things concept and near field communication (NFC) comprising:
   a door monitoring and controlling device (DMCD) for monitoring the open/close state of the automatic garage door, the DMCD comprising:
   one or more near field communication ("NFC") close/open status tag;
   a NFC module, the NFC module and the NFC close/open status tag working together for monitoring the open/close state of the automatic garage door;
   a NFC tag that shad contain network configuration information, which shall be obtained from a manufacturer or provisioned with an smart phone application provided by manufacture and the DMCD module shall use the network configuration data provided by NFC Lag connecting to a router and to the Internet:
   a central processing unit ("CPU") for receiving the close/open status information from the NFC module;
   a network interface module for connecting DMCD through a router in the house via a wireless or wired method to the web-based ADMS;
   a wireless remote control module for and closing the automatic garage door through the internet; and
   a web-based advanced door management system (ADMS) for providing the function of managing device information, collecting current door position status data, sending change door position command, manage user information, accept user request from the Internet, the ADMS comprising:
   a user management module for managing users information, authenticating user log into the system, allowing user to setup alarming rules;
   a device management module for managing the DMCD information, recording door position status received from the DMCD, sending door status change command to the DMCD according to user command; and a user client for providing graphic user interface for authenticating user, displaying position status of monitored doors, accepting user setting, and taking command from users.

2. The automatic garage door automatic monitoring and controlling system of claim 1, wherein the one or more NFC tags provide status signal as well as network configure data.

3. The automatic garage door automatic monitoring and controlling system of claim 1, wherein the one or more NFC tag are attached to the automatic garage door and move along with the automatic garage door.

4. The automatic garage door automatic monitoring and controlling system of claim 3, wherein the NFC module, CPU, network interface module, wireless remote control module are encased in a box and installed on a location close to the garage door.

5. The automatic garage door automatic monitoring and controlling system of claim 4, wherein the DMCD has one NFC close/open status tag, the NFC module detects the presence of the NFC close/open status tag when the NFC close/open status tag comes within the NFC effective close range or detects the absence of the NFC close/open status tag when the NFC close/open status tag moves away from the NFC effective close range and sends the close or open status to the CPU.

6. The automatic garage door automatic monitoring and controlling system of claim 4, wherein the DMCD has two NFC status tags, one being open status tag which is installed at a lower position of the garage door, another being close status tag which is installed at an upper position of the garage door, when the "close tag" moves close to the NFC module, the DMCD knows the door is closed, when the door moves up and the "open tag" passes the NFC module, the DMCD triggers a door open signal.

7. The automatic garage door automatic monitoring and controlling system of claim 1, wherein the CPU further connects and controls peripheral modules and provides software operating environment.

8. The automatic garage door automatic monitoring and controlling system of claim 1 further comprising an alarm module in the ADMS for sending the alarm information via email or instant message or phone call to users.

9. The automatic garage door automatic monitoring and controlling system of claim 8 further comprising an alarm auxiliary module in the DMCD for assisting the alarm module in the ADMS.

10. The automatic garage door automatic monitoring and controlling system of claim 1 further comprising an automatic garage door opener system which includes a remote control for sending an open or control signals and a remote signal receiver for receiving the signals from the remote control.

11. The automatic garage door automatic monitoring and controlling system of claim 1 further comprising a website containing the ADMS or app in mobile device containing the ADMS for consumer to log in and checking garage door status and remotely controlling the garage.

12. A method for automatic garage door automatic monitoring and controlling system comprising the steps of:
providing door monitoring and controlling device ("MACD") which includes a NFC module and one or more NFC tags, a CPU, and a wireless remote control module, the one or more NFC tags are attached to the garage door, the wireless remote control module is connected to the garage door;
providing advanced door management system ("ADMS") which includes device management module;
sensing by the NFC module of the presence or absence of one or more NFC tags;
configuring the MACD to connect to a router in the house;
sending by the NFC module of the garage door open/close status that is received from the NFC tags to the CPU; and
communicating from the CPU of the open/close status to the device management module of the web-based ADMS.

13. The method for automatic garage door automatic monitoring and controlling system of claim 12 further comprising the steps of providing a website containing the ADMS and app in the mobile device containing the ADMS.

14. The method for automatic garage door automatic monitoring and controlling system of claim 13 further comprising the steps of creating a user account once a user registers on the website or app containing the ADMS and providing the user access credentials for the user to log in and providing the user sophisticated functionalities including checking garage door status and remotely controlling open or close of the garage door.

15. The method for automatic garage door automatic monitoring and controlling system of claim 14 further comprising the steps of:
accepting user's garage door change command to open or close garage door;
sending garage door status change command to the CPU of the DMCD;
sending the command to the wireless remote control module; and
opening or closing the garage door.

16. The method for automatic garage door automatic monitoring and controlling system of claim 14 further comprising the step of:
sending alarms to alert the user via email or instant message or phone call to users if the NFC module senses absence of the NFC tag.

* * * * *